United States Patent [19]
Suzuki et al.

[11] Patent Number: 5,336,955
[45] Date of Patent: Aug. 9, 1994

[54] OUTER - ROTOR TYPE SPINDLE MOTOR

[75] Inventors: Yuzuru Suzuki, Sizuoka; Sakae Fujitani, Hamamatsu; Masaaki Inagaki, Sizuoka; Hitoshi Uchida, Nagano, all of Japan

[73] Assignee: Minebea Kabushiki-Kaisha (Minebea Co., Ltd.), Nagano, Japan

[21] Appl. No.: 992,662

[22] Filed: Dec. 18, 1992

[30] Foreign Application Priority Data

Dec. 20, 1991 [JP] Japan ............... 3-111731[U]

[51] Int. Cl.$^5$ ............... H02K 5/16; F16C 23/04
[52] U.S. Cl. ............... 310/90; 310/67 R; 384/496
[58] Field of Search ............... 310/67 R, 90, 261; 360/99.08, 99.09, 100.1; 384/490, 491, 496, 513, 516, 609, 615

[56] References Cited

U.S. PATENT DOCUMENTS 5,214,326  5/1993  Yonei ............... 310/90

FOREIGN PATENT DOCUMENTS

| 676392 | 5/1939 | Fed. Rep. of Germany | 384/496 |
| 57790 | 12/1923 | Sweden | 384/496 |
| 54519 | 10/1990 | Sweden | 384/496 |
| 311078 | 1/1929 | United Kingdom | 384/496 |

Primary Examiner—Steven L. Stephan
Assistant Examiner—Matthew Nguyen
Attorney, Agent, or Firm—Fred Philpitt

[57] ABSTRACT

In an outer-rotor type spindle motor: a front-end portion of a spindle (4) forming a stationary member passes through a central portion of a hub plate (7c) (onto which a disk (11) is loaded) of a rotor yoke (6) forming a rotating member; and, the front-end portion having been passed through the central portion of the hub plate (7a) of the rotor yoke (6) forms a head portion (4c) which is formed into a semispherical shape having been obliquely cut.

2 Claims, 6 Drawing Sheets

OUTER - ROTOR TYPE SPINDLE MOTOR

BACKGROUND OF THE INVENTION

1. Field of the Invention

The present invention relates to an outer-rotor type spindle motor used to drive a disk such as magnetic disks and optical disks of recording units wherein data is stored on the disks.

2. Description of the Prior Art

In general, an outer-rotor type spindle motor is used as a drive motor of a recording unit wherein data is stored on the disk. In this type of spindle motor: a head portion (i.e., a front-end portion) of a spindle firmly fitted in a center of a rotor yoke is projected; and the spindle is adapted to rotate together with the rotor yoke.

The problem of reducing the office automation instruments (such as personal computers and word processors) in size and thickness has been a matter of increasing importance, which also makes it necessary to reduce in size and thickness a drive mechanism of the recording unit used in the office automation instrument.

In such drive mechanism of the recording unit in the office automation instrument, a spindle of a drive motor for the recording unit has its head portion projected from a rotor yoke which is supported by the spindle. Consequently, it is possible to reduce the drive motor in thickness when a projected portion of the spindle is reduced in length. This is, however, practically impossible for the following reasons.

That is, in the recording unit, a suitable media, for example such as a 3.5-inch floppy disk, is fitted to the spindle of the motor by means of an ejector of a loading mechanism so as to be loaded onto a disk chucking mount. In this loading operation, the media or disk is horizontally moved to the vicinity of the spindle, and then moved downward in a direction inclining a very fine angle when the disk reaches a position immediately in front of the spindle, which enables the disk to have its mounting hole fitted to the head portion of the spindle.

Figure 10:
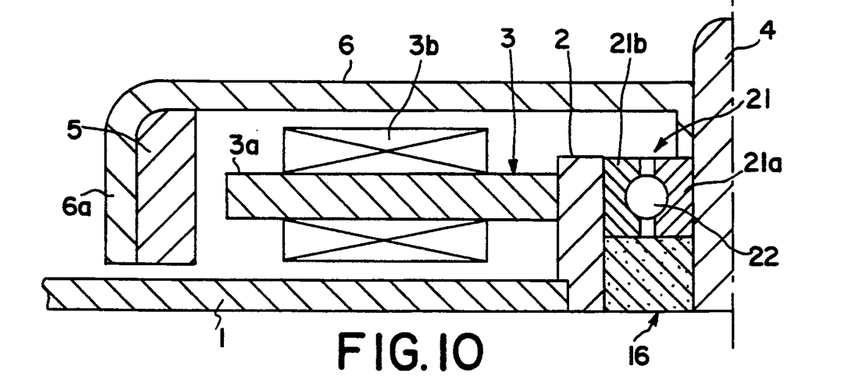
FIG. 10 is a longitudinal sectional view of a left half of an example of the conventional motor.

As for the shape of the spindle, since the disk enters the loading mechanism of the recording unit in a fixed direction, it is necessary to form the head portion of the spindle into a hemispherical shape which makes it possible to load the disk onto the spindle in any angular position in which the spindle stops to stay. On the other hand, as shown in FIG. 10, a spindle motor for driving the disk of a magnetic recording unit has a construction in which: a flange 6a extending downward is formed in an outer peripheral portion of a rotor yoke 6; a plurality of permanent magnets 5, i.e., N's and S's are so arranged as to be spaced alternately with each other on an inner surface of the flange 6a; the rotor yoke 6 has its central portion firmly fitted to a spindle 4 of the motor; a ball bearing 21 has a plurality of balls interposed between an outer ring 21b and an inner ring 21a, and has its inner ring 21b fitted to the spindle 4; a stator holder 2, which also acts as a bearing housing, is mounted on the outer ring 21b or outer peripheral surface of the outer ring 21b; and, a stator 3 is firmly fitted to an outer peripheral surface of the stator holder 2, and has a plurality of soft pole plates 3a which radially extend, on each of which plates 3a a solenoid 3b is mounted. The stator holder 2 is fixedly mounted on a board 1. Upon energizing of the motor, the spindle 4 is rotatably driven together with the rotor yoke 6.

As described above, in the motor having the above construction, the bearing 21 is interposed between the spindle 4 and the stator 3. In case of the ball bearing which includes the inner and the outer ring, as shown in FIG. 11, since shielding plates 15 are provided between the inner and the outer ring so as to shield opposite sides of the balls from dust, the bearing 21 is large in thickness, i.e, large in a longitudinal direction of the spindle 4.

In the motor, it is required to prevent the spindle from vibrating in stabilizing the motor in operation, which is accomplished by providing a pair of ball bearings in series on the spindle. However, in case of the conventional shielded ball bearings, since even one of these conventional bearings is considerably large in thickness, it is impossible to provide these conventional bearings in series on the spindle, because they become quite large in thickness and make it impossible to reduce the motor in thickness.

Figure 12:
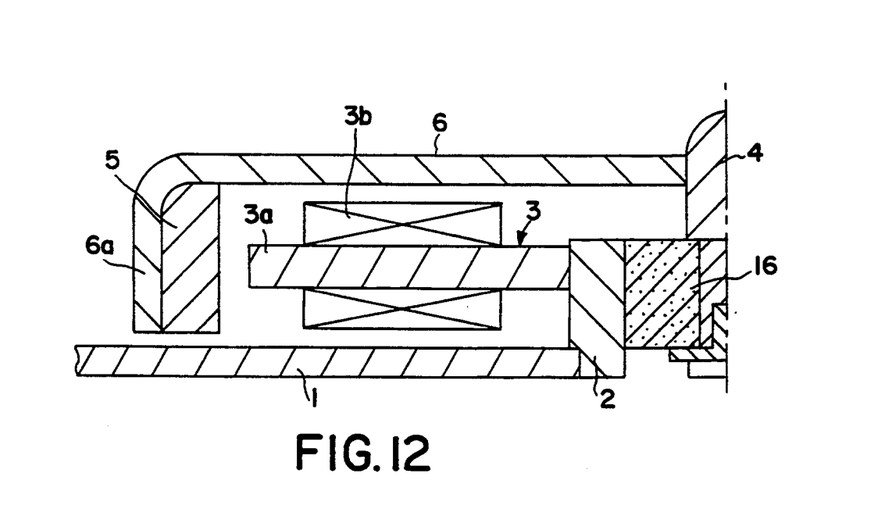
FIG. 12 is a longitudinal sectional view of a left half of another example of the conventional motor.

In order to solve the above problem, heretofore proposed are: a construction shown in FIG. 10, in which a ball bearing 21 and an oil-impregnated metal ring 16 are arranged in series on the spindle; and another construction shown in FIG. 12, in which the ball bearing is not used and only the metal ring 16 is arranged on the spindle to reduce the motor in thickness. In any of these proposed constructions, since the metal ring 16 is of a sliding type producing a relatively large frictional resistance in comparison with the ball bearing, the motor using such metal ring tends to: increase its electric consumption; reduce its service life due to wearing of the ring metal; and be inferior in reliability to a motor using the ball bearing. These are disadvantages inherent in the conventional motor using the metal ring.

Figure 11:
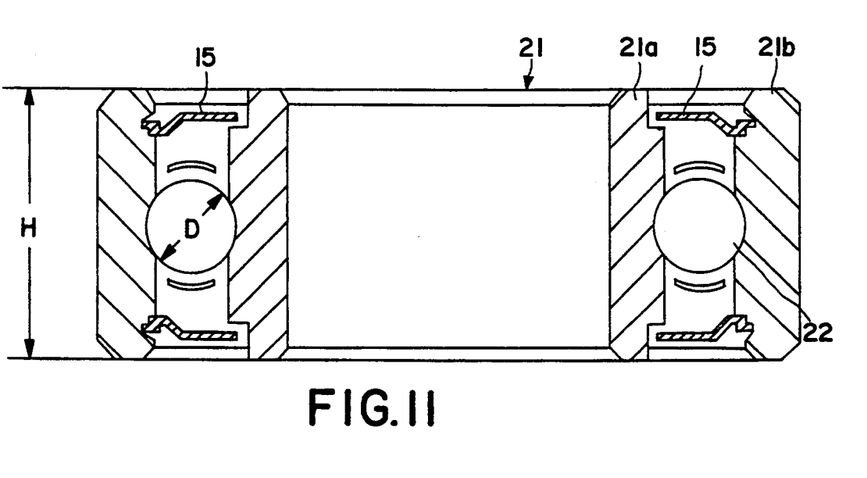
FIG. 11 is a longitudinal sectional view of the ball bearing used in the conventional motor shown in FIG. 10.

In order to reduce the motor in thickness, it is necessary to use as thin a ball bearing (a thickness of which is denoted by the reference character "H" shown in FIG. 11) as possible. However, the ball bearing having a small thickness H naturally requires small-diameter balls. As a result, such ball bearing suffers from:

(1) a small rate load; and (2) a large frictional resistance, which causes a large loss of torque and increases the electric consumption.

SUMMARY OF THE INVENTION

It is an object of the present invention to solve the above problems by providing an outer-rotor type spindle motor a thickness of which is remarkably reduced.

It is another object of the present invention to provide an outer-rotor type spindle motor in which: a head portion of a spindle of the motor is formed into a semispherical shape which is then obliquely cut so as to further reduce a projected portion of the spindle in length in comparison with that of complete semispherical shape, the thus obliquely cut head portion of the spindle enabling the disk to be loaded in a recording unit in a stable manner.

It is further another object of the present invention to provide an outer-rotor type spindle motor in which each ball bearing is reduced in width of its inner and its outer ring and in diameter of each of its balls, which enables the motor to be of a very thin type and be provided with: (1) a sufficient rated load; and, (2) a small frictional resistance, which prevents a large loss of torque and reduces the electric consumption.

The above objects of the present invention is accomplished by providing:

An outer-rotor type spindle motor in which: a front-end portion of a spindle forming a stationary member passes through a central portion of a hub plate (onto which a disk is loaded) of a rotor yoke forming a rotating member; and, the front-end portion having been passed through the central portion of the hub plate of the rotor yoke forms a head portion which is formed into a semispherical shape having been obliquely cut.

Further, the above objects of the present invention is accomplished by providing:

An outer-rotor type spindle motor comprising:

A rotor yoke which has its central portion fitted to a spindle and has a permanent magnet mounted on its outer peripheral flange portion;

a ball bearing which has its balls interposed between its inner ring and its outer ring, each of the balls having a diameter of "D", the inner ring being fitted to the spindle, the ball bearing having a thickness of "H" defined by an equation of $0.8\, H \leq D$; and a stator which is firmly fitted to the outer ring of the ball bearing directly or through a stator holder having been mounted on an outer peripheral surface of the outer ring, the stator being provided with a pole plate on which a solenoid is mounted.

Further, the above objects of the present invention is accomplished by providing:

An outer-rotor type spindle motor comprising:

a rotor yoke which has its central portion fitted to a spindle and has a permanent magnet mounted on its outer peripheral flange portion;

a pair of ball bearings used in series and each of which bearings has its balls interposed between its inner ring and its outer ring, each of the balls having a diameter of "D", the inner rings of the pair of ball bearings being fitted to the spindle in a condition in which the inner rings are urged toward each other, the ball bearing having a thickness of "H" defined by an equation of $0.8\, H \leq D$, the outer rings of the pair of ball bearings being firmly fitted to a corresponding inner surface of the stator holder so as to be axially spaced apart from each other, whereby a gap is formed between the outer rings; and a stator which is firmly fitted to the outer ring of the ball bearing directly or through a stator holder having been mounted on an outer peripheral surface of the outer ring, the stator being provided with a pole plate on which a solenoid is mounted.

DESCRIPTION OF THE PREFERRED EMBODIMENTS

Now, the present invention will be described in detail with reference to the drawings.

Figure 1:
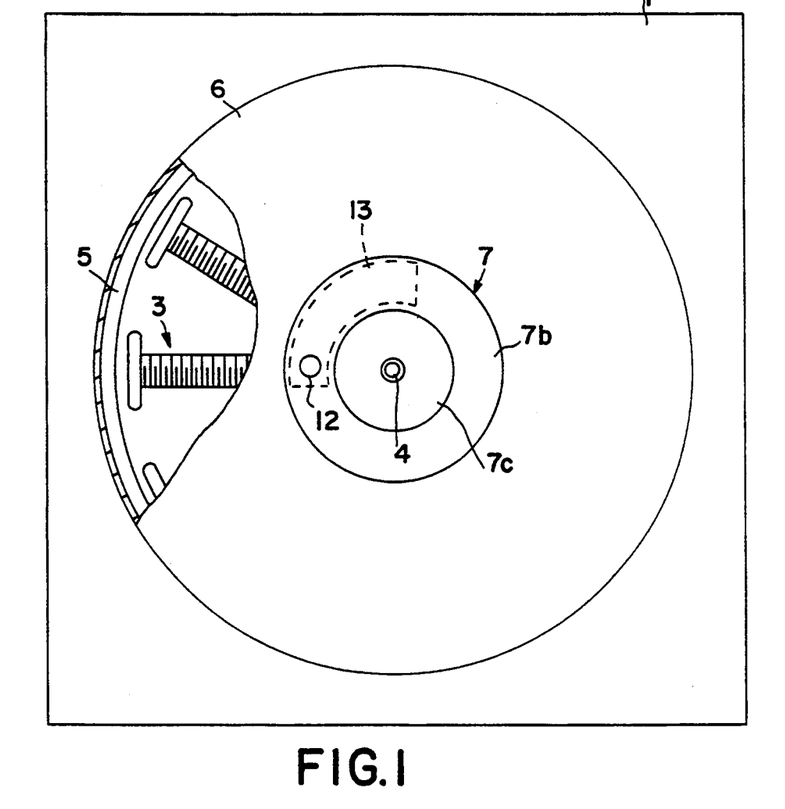
FIG. 1 is a partially broken plan view of an embodiment of the outer-rotor type spindle motor of the present invention.
Figure 2:
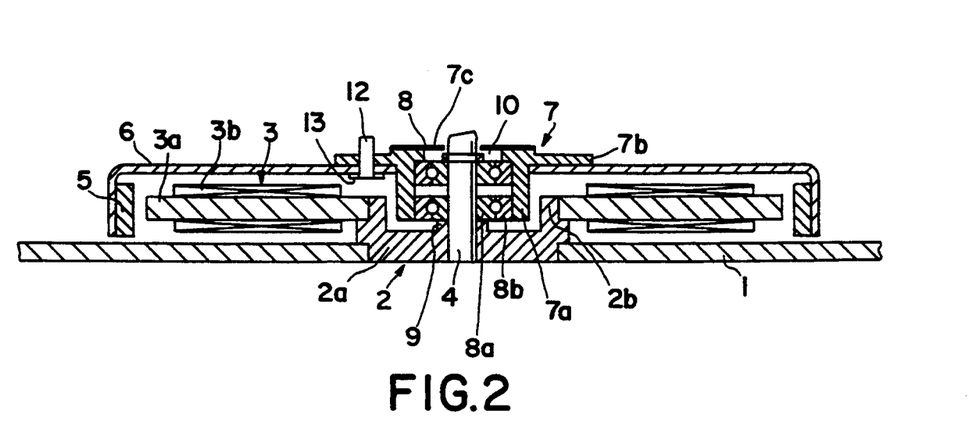
FIG. 2 is a longitudinal sectional of the motor of the present invention shown in FIG. 1.
Figure 3:
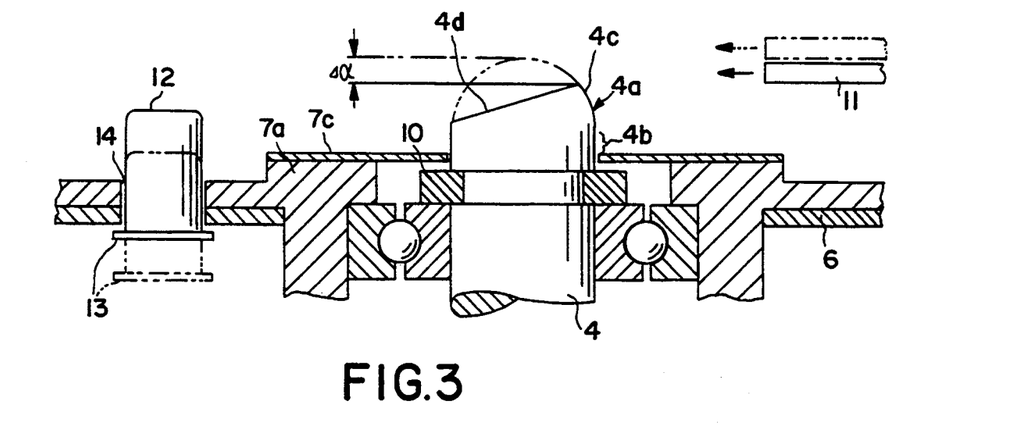
FIG. 3 is an enlarged longitudinal sectional view of an essential part of the motor of the present invention shown in FIG. 1.

FIGS. 1 to 3 show an embodiment of an outer-rotor type spindle motor of the present invention.

As shown in FIGS. 1 to 3, a board 1 is provided with a hole to which a lower portion of a stator holder 2 is firmly fitted. The stator holder 2 is provided with a bottom plate 2a an outer peripheral portion of which is formed into a cylindrical rib portion 2b so that the stator holder 2 assumes a cylindrical shape having a bottom plate. Firmly fitted to the rib portion 2b of the stator holder 2 is a central portion of a stator 3 which is provided with a plurality of pole plates 3a which radially extend from the central portion of the stator 3 and are made of soft magnetic material, on each of which pole plates 3a a solenoid 3b is mounted.

A spindle 4 is fixedly mounted in a center of the bottom plate of the stator holder 2 so as to extend upward in a direction perpendicular to the bottom plate.

A rotor yoke 6 made of soft magnetic material is provided with: an outer peripheral flange on which a permanent magnet 5 is mounted; and a central hub base 7 which is rotatably mounted on the spindle 4 through ball bearings 8 and also acts as a bearing housing.

That is, the hub base 7 is provided with a cylindrical housing portion 7a which has an outer peripheral part of its upper portion formed into a chucking magnet portion 7b onto which a disk is loaded. The housing portion 7a of the hub base 7 is firmly fitted to a central hole of the rotor yoke 6.

Firmly fitted to an inner surface of the housing portion 7a of the hub base 7 are outer rings 8b of the ball bearings 8, inner rings 8a of which are firmly fitted to the spindle 4. On the other hand, one of the inner rings 8a has its lower surface supported by a boss portion 9 of the stator holder 2, the boss portion 9 being formed in a central portion of the bottom plate of the stator holder 2. The other one of the inner rings 8a abuts on a stop means such as a snap ring 10 fitted to a groove of the spindle 4.

A hub plate 7c is mounted on an upper-end surface of the housing portion 7a of the hub base 7 to act as a shielding plate closing the upper portion of the hub base 7.

Consequently, in operation, the rotor yoke 6 is rotatable, while the spindle 4 is stationary.

In the motor of the present invention: as shown in FIG. 3, the spindle 4 has its upper portion 4a passed through the hub plate 7c upward, so that the thus passed portion or head portion 4c extending upward from a round neck portion 4b of the spindle 4 is formed into a semispherical shape which is obliquely cut to form an oblique surface 4d. This oblique surface 4d has the substantially same tilt angle as that of the direction in which disk 11 is obliquely moved downward when loaded, whereby the disk 11 can be easily engaged with the head portion 4c of the spindle 4 in loading thereof. As is clear from FIG. 4, the head portion 4c of the spindle 4 extends upward from a central hole of the hub plate or shielding plate 7c.

The reference numeral 12 denotes a drive pin which has one of its ends fixed to a free end of a leaf spring 13 (which is fixedly mounted on a lower surface of the rotor yoke 6) and permits the other of its ends to pass through a hole 14 (which is formed in both the rotor yoke 6 and the hub base 7) upward under the influence of a resilient force exerted by the leaf spring 13, whereby the drive pin 12 engages with a reference hole of the disk 11 loaded onto the hub base 7 and rotatably drive the disk 11 in operation.

Incidentally, the drive pin 12 is depressed so as to be retracted from the upper surface of the hub base 7 under the influence of the weight of the disk 11 when the disk 11 has its reference hole misaligned with the drive pin 12 in loading operation thereof. When the reference hole of the disk 11 is aligned with the drive pin 12, the drive pin 12 is pushed into the reference hole of the disk 11 by the leaf spring 13.

In this embodiment of the present invention, as shown in FIG. 3, since the head portion 4c of the spindle 4 passing through the hub plate 7c upward is formed into the obliquely-cut semispherical shape, this shape is lower in height than a complete semispherical shape shown in dotted line by an amount of $\Delta\alpha$, which reduces the required disk-loading space over the hub base 7 by the amount of $\Delta\alpha$, and thereby a disk-loading unit can be reduced by that thickness.

In addition, since the upper surface of the head portion 4c of the spindle 4 is not formed into a plane perpendicular to the longitudinal axis of the spindle 4, but has the oblique surface 4d, the head portion 4c has one side lower than the other side. Consequently, a disk 11 can be loaded onto the hub plate 7c in a stable manner even when the disk 11 is loaded in the condition in which the disk 11 has a center line of its reference hole slightly misaligned with the longitudinal axis of the spindle 4, because the obliquely-cut semispherical head portion 4c of the spindle 4 can smoothly guide the reference hole of the disk 11 so as to be aligned with the neck portion 4d of the spindle 4, whereby a disk 11 is steadily loaded onto the hub plate 7c.

Figure 4:
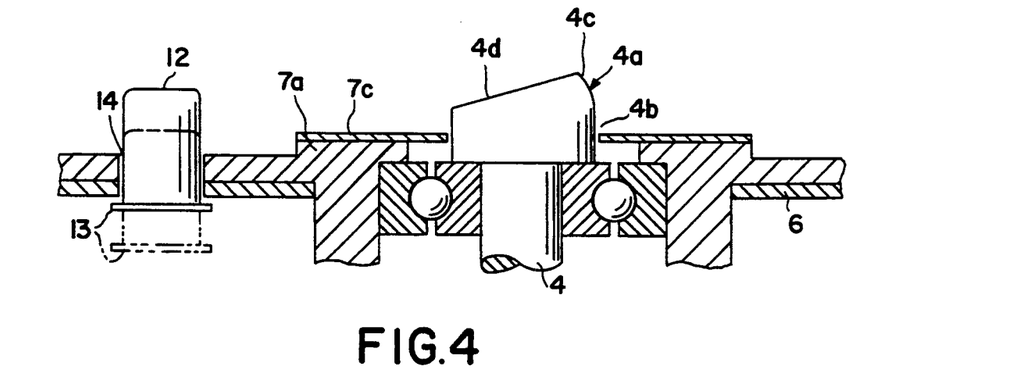
FIG. 4 is an enlarged longitudinal sectional view of an essential part of another embodiment of the motor of the present invention.

FIG. 4 shows another embodiment of the present invention. In this embodiment, the head portion 4c of the spindle 4 is formed into a large-diameter portion having a lower shoulder which abuts on an upper surface of the inner ring of the ball bearing so as to urge the inner ring downward. The remaining construction of this embodiment shown in FIG. 4 is the same as that of the embodiment shown in FIG. 3.

In the embodiment shown in FIG. 4, the head portion of the spindle 4 extends upward from the neck portion of the spindle to pass through the hub plate 7c upward, on which plate 7c the disk is loaded. Such head portion of the spindle 4 is formed into an obliquely-cut semispherical shape. Consequently, such head portion of the spindle 4 is lower in height than the head portion of a completely semispherical shape, which enables the required disk-loading space over the hub plate 7c to be reduced.

Since the head portion of the spindle 4 is not formed into a cylindrical shape but into an obliquely-cut semispherical shape, a disk 11 can be loaded onto the hub plate 7c in a stable manner even when the disk 11 is loaded in a condition in which the disk 11 has the center line of its reference hole slightly misaligned with the longitudinal axis of the spindle 4, because the obliquely-cut semispherical head portion 4c of the spindle 4 can smoothly guide the reference hole of the disk 11 so as to be aligned with the neck portion 4d of the spindle 4, whereby a disk 11 is steadily loaded onto the hub plate 7c.

In operation, since the spindle 4 stays stationarily in operation to have its oblique surface 4d oriented in a fixed direction in which the disk is loaded onto the hub plate 7c, there is no fear that the head portion 4c of the spindle 4 (which portion 4c assumes an obliquely-cut semispherical shape) impairs loading and unloading operations of the disk.

Further, in a disk recording unit provided with a disk drive mechanism using the motor of the present invention, it is possible to reduce in thickness a disk loading mechanism which loads the disk onto the hub plate of the rotor yoke in a stable manner and ensures the disk the writing and retrieving operations of data without any error.

FIG. 2 shows another embodiment of the motor of the present invention, in which a single ball bearing is used. As for the same parts as those of the conventional motor having been described, there parts are denoted by the same reference numerals as those used in the above description of the conventional motor and not described here to avoid redundancy in description.

Figure 5:
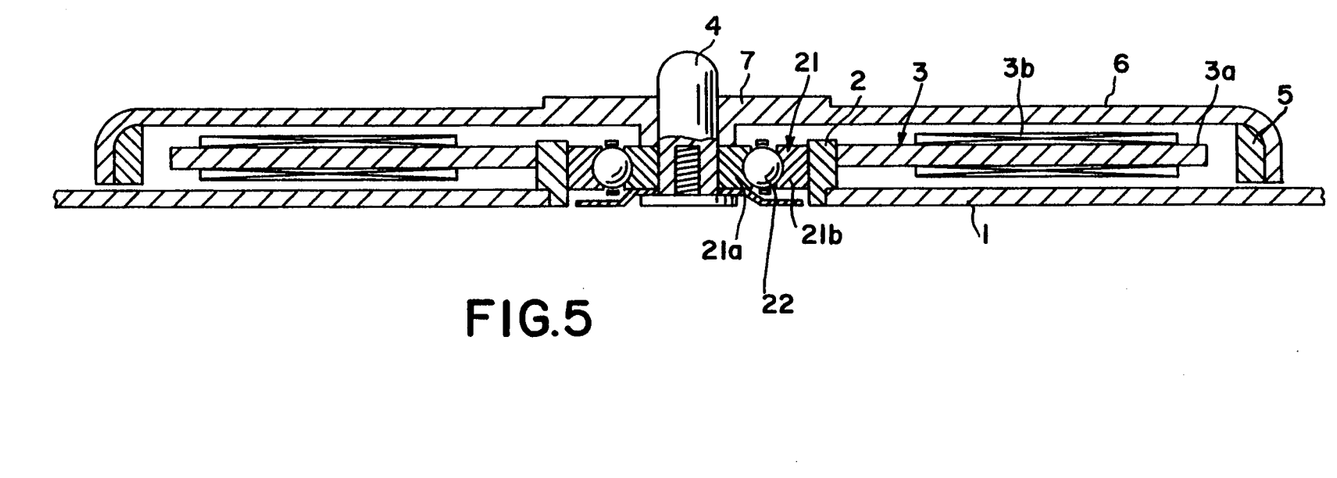
FIG. 5 is a longitudinal sectional view of further another embodiment of the motor of the present invention.
Figure 6:
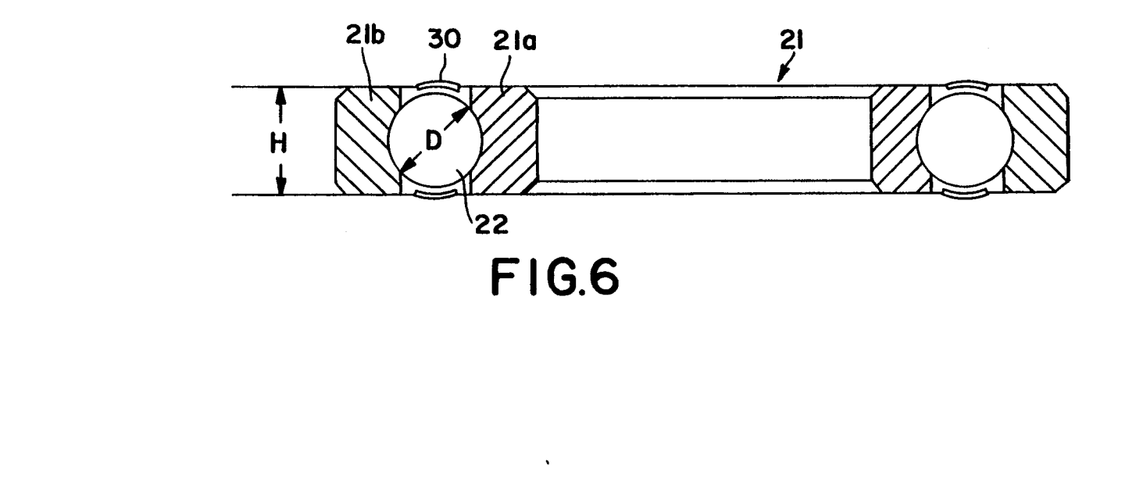
FIG. 6 is a longitudinal sectional view of a ball bearing used in the motor of the present invention shown in FIG. 5.

As is clear from FIG. 6, the embodiment of the present invention shown in FIG. 5 is characterized by the following equation:

$$0.8H \leq D$$

where: H is a thickness of the entire ball bearing 21; and D is a diameter of each ball 22 of the ball bearing 21.

Figure 7:
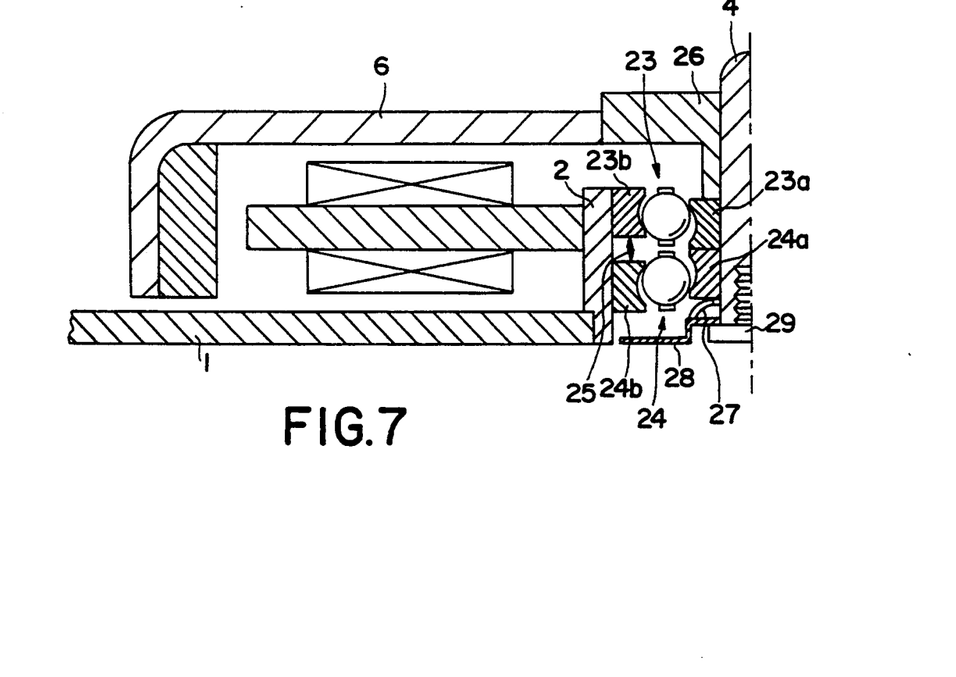
FIG. 7 is a longitudinal sectional view of an essential part of still further another embodiment of the motor of the present invention.
Figure 8:
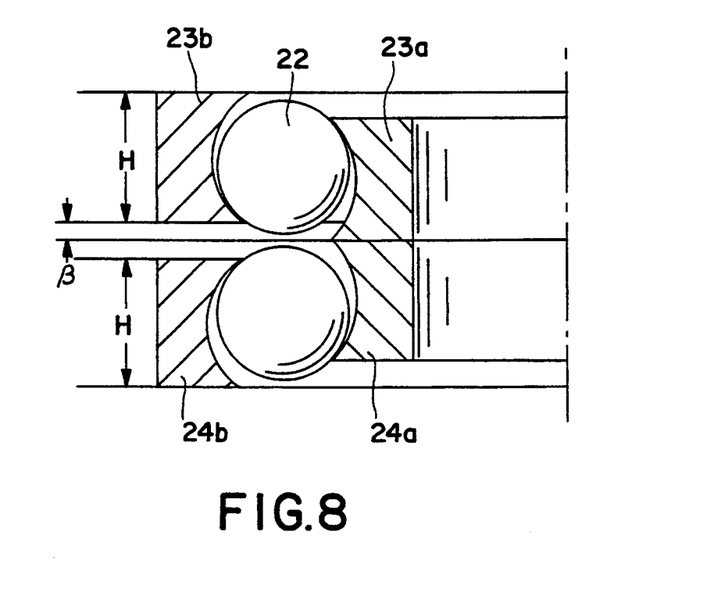
FIG. 8 is a partially enlarged longitudinal sectional view of ball bearings used in the motor of the present invention shown in FIG. 7.
Figures 9A, 9B:
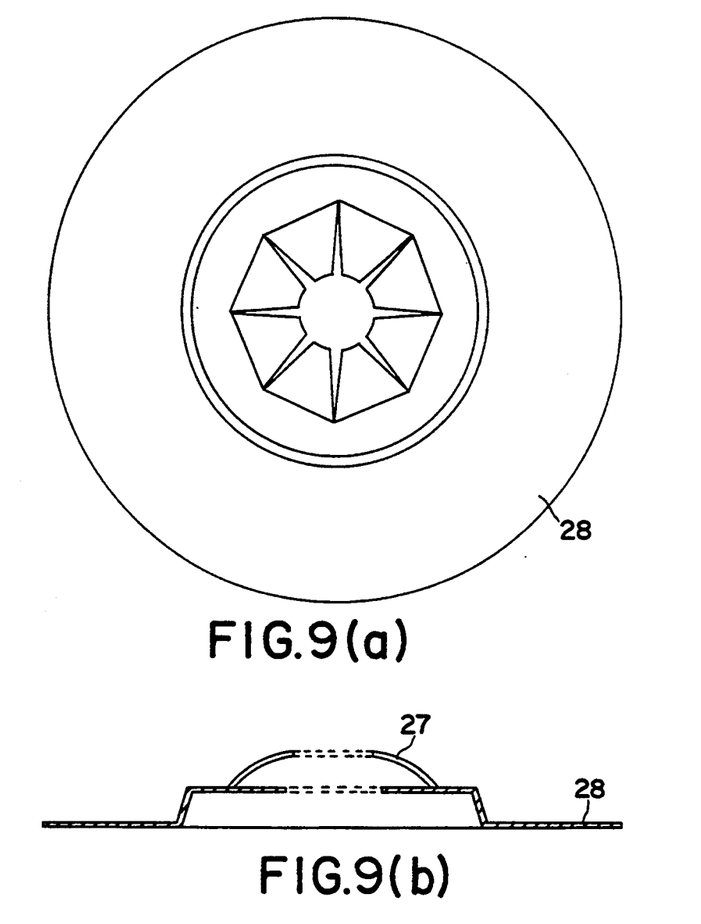
FIG. 9(a) is a plan view of the shielding plate.
FIG. 9(b) is a longitudinal sectional view of the shielding plate shown in FIG. 9(a)

FIG. 7 shows a further another embodiment of the present invention, in which a pair of ball bearings 23, 24 (each of which is characterized by the above equation) are mounted on the spindle 4 in series, and have their inner rings 23a, 24a pressed together.

Both the outer rings 23b, 24b are fixed to the stator holder 2 so as to be spaced apart from each other to produce a gap 25 between corresponding axial inner-end surfaces thereof. The inner rings 23a, 24a are sandwiched between a lower-end surface of a central boss portion 26 of a rotor yoke 6 and a spring 27 so as to have their axial inner-end surfaces abut on each other in a pressed condition.

As for the ball bearings 23 and 24, the inner rings 23a and 24a are axially misaligned with their corresponding outer rings 23b and 24b by an amount of $\beta$, respectively. As a result, the outer rings 23b and 24b are axially spaced apart from each other by an amount of a gap having a value of $2\beta$.

In this embodiment shown in FIG. 7, the spring 27 urging the inner ring 24a upward is constructed of a plurality of raised segments formed in the vicinity of a central portion of the shielding plate 28 which prevents dust from entering the interior of the motor and is fixed to the spindle 4 by means of a screw 29.

Incidentally, in FIG. 6, the reference numeral 30 denotes a retainer.

Since the motor of this embodiment of the present invention shown in FIG. 7 uses the ball bearings 23, 24 (each of which is defined by the above equation) for supporting the spindle 4, the motor of the present invention can be further reduced in thickness than a motor using the conventional ball bearing defined by an equation of H>D, which enables the motor of the present invention to be of a thin type.

Further, since the pair of the ball bearings are used in the motor of the present invention, it is possible for the motor of the present invention to reduce vibration in operation, to be excellent in safety and to be reliable without lowering its environmental properties as to temperature variations by providing the axial gap between the outer rings of the ball bearings and applying a pressure to the inner rings thereof, whereby the motor of the present invention can be formed into a very thin type of motor.

What is claimed is:

1. An outer-rotor type spindle motor comprising in combination:
   (a) a rotor yoke (6) which has its central portion fitted to a spindle (4) and which has a permanent magnet (5) mounted on the inside of its outer peripheral flange portion;
   (b) a pair of ball bearings (8) arranged one above the other, each of the ball bearings (8) having its ball interposed between an inner ring (8a) and an outer ring (8b), said inner rings (8a) of said pair of ball bearings (8) being fitted to said spindle (4) in a condition so that said inner rings (8a) are urged toward each other, said outer rings (8b) of said pair of ball bearings (8) being firmly fitted to the inner surface of a stator holder (2) so as to be axially spaced apart from each other, whereby a gap (25) is formed between said outer rings (8b);
   (c) a stator (3) which is firmly connected to said outer rings (8b) of said ball bearings (8) directly or through a stator holder (2) that is mounted on the outer peripheral surfaces of said outer rings (8b), said stator (3) being provided with a plurality of pole plates (3a) on which solenoids (3b) are mounted, and
   (d) a shielding plate (28) firmly fitted over the lower end of said spindle (4) to prevent dust from entering the interior of said motor, the central portion of said shielding plate (28) being provided with a spring portion (27) that applies pressure against the bottom surface of the lower inner ring (8a) of said pair of ball bearings (8).

2. An outer-rotor type spindle motor according to claim 1 wherein the relation between the diameter "D" of the balls of said ball bearing and the thickness "H" of each of said ball bearing rings is $0.8\ H \leq D$.

* * * * *